(12) United States Patent
Rantet

(10) Patent No.: US 7,215,330 B2
(45) Date of Patent: May 8, 2007

(54) TOUCH-SENSITIVE SURFACE WHICH IS ALSO SENSITIVE TO PRESSURE LEVELS

(75) Inventor: Dominique Rantet, Beaumont sur Leze (FR)

(73) Assignee: Siemens VDO Automotive, Toulouse (FR)

(*) Notice: Subject to any disclaimer, the term of this patent is extended or adjusted under 35 U.S.C. 154(b) by 533 days.

(21) Appl. No.: 10/279,967

(22) Filed: Oct. 25, 2002

(65) Prior Publication Data

US 2003/0079920 A1 May 1, 2003

(30) Foreign Application Priority Data

Oct. 25, 2001 (FR) .................................. 01 13790

(51) Int. Cl.
*G09G 5/00* (2006.01)
(52) U.S. Cl. ..................................... 345/173
(58) Field of Classification Search ........ 345/173–175; 178/18.05, 190.6
See application file for complete search history.

(56) References Cited

U.S. PATENT DOCUMENTS

| | | | | |
|---|---|---|---|---|
| 4,555,693 A | * | 11/1985 | Danish et al. ................. 341/5 |
| 4,587,378 A | * | 5/1986 | Moore ........................ 345/173 |
| 4,678,869 A | * | 7/1987 | Kable ....................... 178/18.05 |
| 5,159,159 A | | 10/1992 | Asher | |
| 5,432,304 A | * | 7/1995 | Tanahashi ................ 178/18.02 |
| 5,518,078 A | * | 5/1996 | Tsujioka et al. .......... 178/18.05 |
| 5,554,828 A | * | 9/1996 | Primm ..................... 178/19.06 |
| 5,719,597 A | * | 2/1998 | Fong ........................... 345/174 |
| 5,818,430 A | * | 10/1998 | Heiser ......................... 345/174 |
| 6,459,424 B1 | * | 10/2002 | Resman ....................... 345/173 |
| 6,552,718 B2 | * | 4/2003 | Ahn et al. .................... 345/173 |
| 6,621,486 B2 | * | 9/2003 | Park et al. ................... 345/173 |
| 2003/0132920 A1 | * | 7/2003 | Lee et al. .................... 345/173 |

FOREIGN PATENT DOCUMENTS

| | | |
|---|---|---|
| EP | 0 435 438 | 7/1991 |
| FR | 28313139 A * | 4/2003 |

* cited by examiner

*Primary Examiner*—Sumati Lefkowitz
*Assistant Examiner*—Ke Xiao
(74) *Attorney, Agent, or Firm*—Young & Thompson

(57) ABSTRACT

This sensitive surface comprises two films (2, 4) facing each other and means for keeping these two films a certain distance apart when no pressure is exerted on the surface.

Each film (2, 4) has, on its face turned toward the other film:
an array of conducting tracks (6, 8) that do not touch one another, each having a low resistance;
a resistive band (12, 16); and
resistive elements (10, 14), each resistive element connecting a conducting track to the resistive band.

To measure the pressure level exerted on this sensitive surface, the resistance equivalent to the resistance of the resistive elements lying in series and in parallel, after at least two conducting tracks have been brought into contact with each other, is measured.

10 Claims, 2 Drawing Sheets

TOUCH-SENSITIVE SURFACE WHICH IS ALSO SENSITIVE TO PRESSURE LEVELS

The present invention relates to a touch-sensitive surface which is also sensitive to pressure levels.

More and more often control keys are no longer consisting of a button or cursor, but a touch-sensitive surface thus making it possible to obtain a tactile control system. The size of the touch-sensitive surfaces used depends on the application chosen. The sensitive surface may be limited to any area substantially equivalent to that of a finger, but it may also be larger than a computer screen or even larger still.

Sensitive surfaces of this kind generally consist of two films on which conducting elements have been deposited. The two films are placed one on top of the other, the deposited conducting elements facing one another. At rest, the two films are kept a certain distance apart in such a way that the deposited conducting elements do not touch one another. When a user then touches the accessible film, the deposited conducting elements come locally into contact with each other, thus closing an electrical circuit. Sensitive surfaces of this kind are used for producing tactile controls sensitive to the localized pressure of a user's finger, but also for controls sensitive to movement of this finger over the surface of the control. In this case, at least one resistive region is provided on the films. Thus, when the user's finger moves over the sensitive surface, a variation in the resistance of the electrical circuit created by the pressure of the finger is produced. By measuring this resistance, it is then possible to know the position of the finger and a movement may thus be detected.

Thus, for example, sensitive surfaces referred to as "resistive-type" surfaces are known. They comprise two resistive planes placed opposite each other and held a certain distance apart at rest. When a finger presses on the sensitive surface, the latter deforms and electrical contact is made between the two surfaces. Each resistive plane is a film, generally made of synthetic material, covered with a thin metal layer, for example an indium oxide, and two opposed edges of which are each provided with an electrode. To produce the sensitive surface, the two resistive films are placed in such a way that the electrodes of one film are substantially perpendicular to the electrodes of the other film. The position of the finger exerting pressure on the sensitive surface is then determined by applying a voltage between the two electrodes of one film and by measuring the voltage induced at the electrodes of the other film. The potentiometric ratio then determines the relative position of the finger along one of the axes. Thus, by taking two measurements, the position of the finger on the sensitive surface is known.

These resistive-type sensitive surfaces also allow a movement of the -finger to be detected, but they do not make it possible to determine with what pressure the user is pressing on the sensitive surface. To obtain this type of information, it is usual to use a sensitive surface referred to as a "capacitive-type" sensitive surface.

In such a sensitive surface, one again finds mainly a support (film) covered with a conducting layer, said conducting layer itself being covered with a very thin insulating layer. However, when a finger is pressed on the sensitive surface, the capacitance between the finger and the conducting layer is in this case measured, and no longer only a resistance. In this type of sensitive surface, the pressure level exerted by a finger may be detected, since the harder the user presses with his finger the greater the area of contact with the insulation and therefore the higher the measured capacitance.

To know the position of the finger, either the conducting layer is produced in the form of a matrix of conductors (in this case, there are very many wires to be controlled) or this layer is a resistive layer (and in this case the pressure of the finger is not measured). The RC time constants are then measured at only a few points.

The drawbacks with capacitive systems are their cost (extremely thin insulation that has to be very wear resistant) and the preclusion of using gloves.

The object of the present invention is therefore to provide a resistive device making it possible to determine both the position of a user's finger and the pressure level exerted by this finger.

For this purpose, the touch-sensitive surface that it provides is a sensitive surface comprising two films facing each other and means for keeping these two films a certain distance apart when no pressure is exerted on the surface.

According to the invention, each film has, on its face turned toward the other film:

an array of conducting tracks that do not touch one another, each having a low resistance;

a resistive band; and resistive elements, each resistive element connecting a conducting track to the resistive band.

Such a sensitive surface is of the resistive type and also makes it possible to measure a pressure level by virtue of the presence of the resistive elements placed between the conducting tracks and the resistive bands. This is because, when a contact is established between the two films, all that is then required is to measure the resistance of the assembly formed by the tracks and the resistive elements corresponding to the tracks in electrical contact in order to have an indication about the pressure level exerted on the sensitive surface. This is because the resistance of this assembly depends on the number of rows and columns in contact with one another.

In a preferred embodiment, the resistive band of each film is produced along one edge of this film.

For easier management of the system, provision is advantageously made for the conductive tracks to form an array of substantially parallel lines on each film.

In a preferred embodiment, the resistance of a resistive band is substantially lower than the resistance of each resistive element connecting a conducting track to this resistive band.

The resistive bands and the resistive elements are made of carbon, for example, which is screen-printed onto the corresponding film.

To make it possible to measure the position of the point of contact and also the pressure level exerted on the sensitive surface, an advantageous embodiment provides for each end of the resistive band to be connected to a connection port and for one end to be connected to its connection port via a resistive component of known resistance mounted in parallel with a diode.

In another embodiment, each end of the resistive band is connected to a connection port, one end is connected to its connection port via a resistive component of known resistance and an additional connection port connected to the sensitive surface between the resistive component and the corresponding resistive band is provided.

The present invention also relates to a method for measuring a pressure level exerted on a touch-sensitive surface comprising two films each equipped with an array of conducting tracks.

In this measurement method according to the invention, a resistive element of known resistance is associated with each conducting track and a measurement of the resistance equivalent to the resistance of the resistive elements lying in series and in parallel, after at least two conducting tracks have been brought into contact with each other, is made.

In this method of measuring a pressure level, the measurement of the equivalent resistance is, for example, made by measuring a potential. This potential measurement is, for example, made in such a way that the resistive elements lying in series and in parallel are placed in series with at least one resistive component and that the voltage measurement is carried out at the terminals of the array comprising the resistive elements and optionally one or more resistive components of known or negligible resistance.

The details and advantages of the present invention will become more clearly apparent from the description which follows, with reference to the appended schematic drawing in which.

Figure 2:
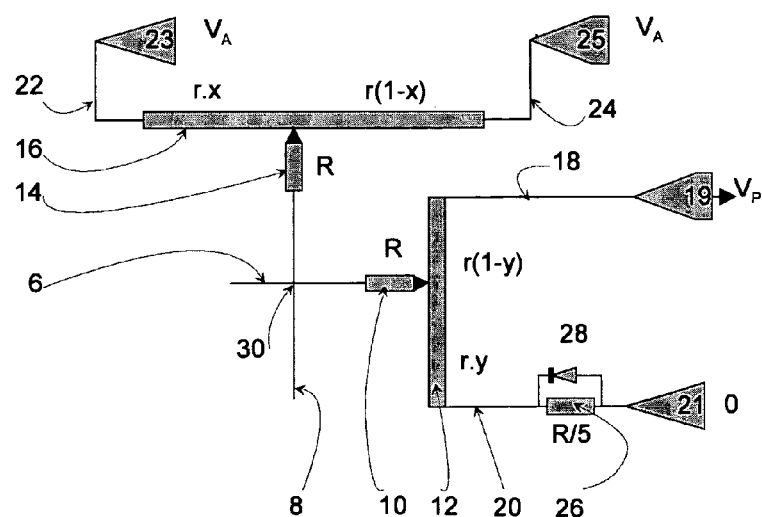
FIG. 2 illustrates the pressure measurement device when light pressure is exerted on the sensitive surface of FIG. 1.
Figure 3:
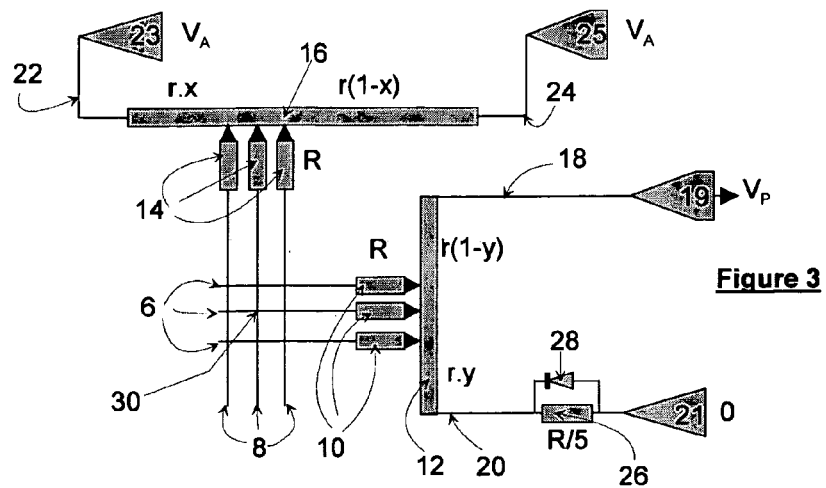
Figure 4:
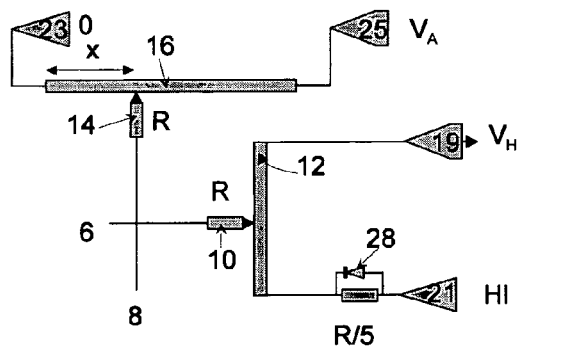
Figure 5:
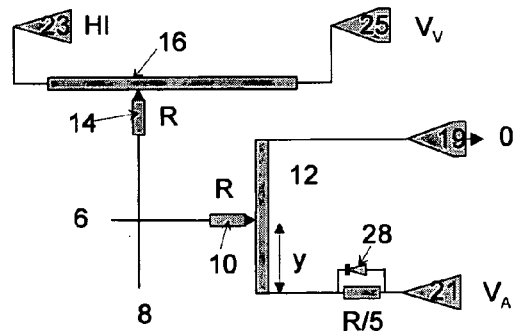
Figure 6:
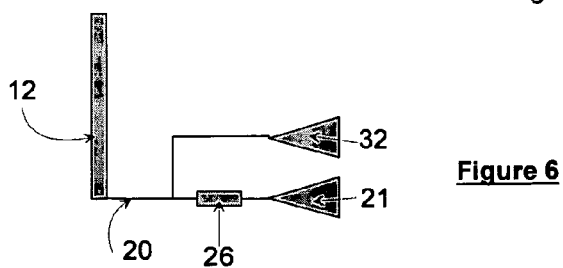

FIG. 3 corresponds to FIG. 2 for a higher pressure level;

FIG. 4 is a view corresponding to FIG. 2 during a position measurement along a first axis;

FIG. 5 is a view corresponding to FIG. 3 for a position measurement along a second axis; and FIG. 6 is a detail view of FIGS. 2 to 5 for an alternative embodiment.

Figure 1:
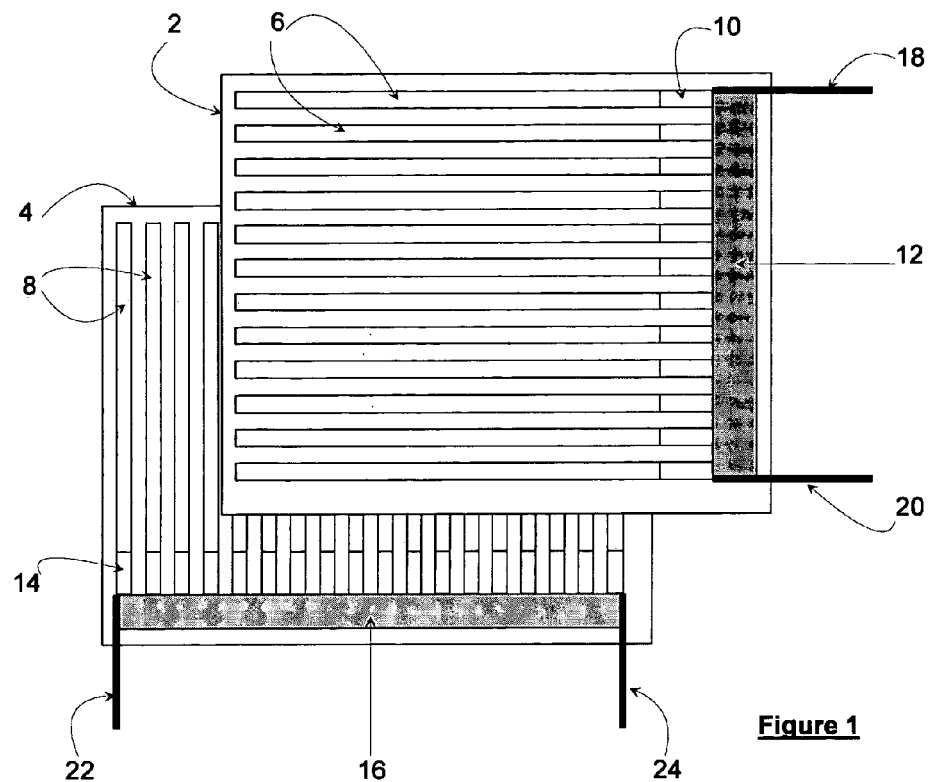
FIG. 1 is an exploded top view of a sensitive surface according to the invention.

FIG. 1 shows two films facing each other, an upper film 2 and a lower film 4.

On its face turned toward the lower film 4, the upper film 2 has an array of parallel rows 6 extending over almost the entire length of the upper film 2. These rows 6 are equidistant from one another and are all identical. They are produced by depositing a thin layer of conducting material, for example a metal (silver) layer.

On its face turned toward the upper film 2, the lower film 4 has an array of parallel columns 8. These columns 8 extend over practically the entire width of the lower film 4 and are equidistant from one another. All the columns 8 are identical. As with the rows 6, they are produced by depositing metallic material (for example silver). As shown in the drawing, the columns 8 are oriented in such a way that they are perpendicular to the rows 6.

In the illustrative example shown in FIG. 1, the rows and columns are perfectly straight. However, other embodiments may be envisioned.

The ends of the rows 6 located on the right in FIG. 1 are all connected via a resistive element 10 to a resistive band 12. These resistive elements 10 and the resistive band 12 are, for example, made by screen printing. The material used for these resistive elements 10 and the resistive band 12 is, for example, carbon.

Likewise, on the lower film 4, the ends of the conducting columns 8 located toward the bottom in FIG. 1 are all connected via a resistive element 14 to a resistive band 16. In this case too, these resistive elements 14 and the resistive band 16 are made from carbon by screen printing.

The resistive band 12 is equipped at each of its ends with a connection lead 18, 20 especially for connecting the resistive band 12 to a measurement device. Likewise, the resistive band 16 is provided with connection leads 22, 24 at each of its ends.

The dimensions of the two films 2, 4 are identical. To form the sensitive surface, these two films are superposed while keeping, however, a small gap between them when no pressure is exerted on one or other of the films. Insulating spacing balls (not shown in the drawing) distributed within the gap separating the two films 2, 4 allow the rows 6 to be kept at a certain distance from the columns 8 when no pressure is exerted on the films 2, 4.

When the lower film 4 is placed on a support and pressure is exerted locally, for example by touching the upper film 2 with a user's forefinger, a row 6 comes into contact with a column 8. It is then possible to detect that contact has been made and it is also possible to determine the pressure level of the contact and the position of the contact point as described below.

FIGS. 2 to 5 show diagrammatically, in part, the sensitive surface shown in FIG. 1. These figures show schematically the resistive bands 12 and 16, the connection leads 18, 20, 22 and 24, one or more rows 6 with the corresponding resistive elements 10 and one or more columns 8 with the corresponding resistive elements 14.

It will be noted that each connection lead is connected to a connection port. Thus, the connection lead 18 is connected to a connection port 19, the connection lead 20 is connected to a connection port 21, the connection lead 22 is connected to a connection port 23 and the connection lead 24 is connected to a connection port 25.

It will also be noted that a resistive component 26, mounted in parallel with a diode 28, is placed between the connection port 21 and the resistive band 12.

It will be assumed in the rest of the description that each resistive band 12, 16 has a resistance r, while each resistive element 10, 14 has a resistance R. As shown in the drawing, the resistive component 26, for its part, has a resistance R/5.

In FIGS. 2 to 5, the point of contact between the two films 2 and 4 bears the reference 30. This point of contact corresponds to one or more columns 8. The resistance of that portion of the resistive band 16 lying between the column(s) 8 corresponding to the point of contact 30 and the connection lead 22 has a value rx, x being less than or equal to 1. Thus, the rest of the resistive band between the column(s) corresponds to the point of contact 30 and the connection lead 24 will then be r (1−x). Likewise, for the resistive band 12, a coefficient y (0<y<1), as shown in the drawing, is defined.

FIG. 2 shows the situation in which light pressure is applied to the sensitive surface. In this situation, a single row 6 is in contact with a single column 8. In FIG. 3, stronger pressure is applied and it is three rows 6 that are in electrical contact with three columns 8. The pressure level is then determined as indicated below.

To make the measurement, the same voltage, called $V_a$, is applied to the two ends of the resistive band 16. The connection ports 23 and 25 are therefore at the potential $V_a$. The port 21 is itself grounded, that is to say it is at the 0 potential. At the fourth port 19, a potential measurement is made. The apparatus used to make this voltage measurement has a high impedance compared with those of the circuit. The potential at the port 19 is called $V_p$.

It will be noted that the resistive elements 10 and 14 in FIG. 2 are in series. The resistance equivalent to these resistive elements is therefore 2R.

As no current can flow in that part of the resistive band 12 lying beyond the row 6 toward the port 19 (quasi-infinite impedance), Ohm's law gives the following equation:

$$V_p = V_a(R/5 + ry)/(r(x-x^2) + 2R + R/5 + ry). \quad (1)$$

Assuming furthermore that:

$$r \ll R, \quad (2)$$

it will be assumed in this case that:

$$10r < R. \quad (3)$$

In this case, the terms involving the value r in equation (1) become negligible. The following equation is therefore obtained:

$$V_p \sim V_a(R/5)/(2R+R/5)=(1/11)V_a \sim 0.09V_a. \quad (4)$$

Referring now to FIG. 3, in which three rows 6 cross three columns 8, there are, between the two resistive bands 12 and 16, three arrays placed in parallel with two resistive elements 10 and 14 in series. The overall resistance between the resistive bands 12 and 16 is then 2R/3, it being recalled here that R is the value of the resistance of a resistive element 10 or 14. By then applying Ohm's law again, the following equation (5) corresponding to the above equation (1) is obtained:

$$V_p = V_a(R/5)+ry)/(r(x-x^2)+2R/3+R/5+ry). \quad (5)$$

Equations 2 and 3 are again valid here. Then, by neglecting terms containing the value r, the following approximation is obtained:

$$V_p \sim V_a(R/5)/(2R/3)+R/5)=(3/13)V_a \sim 0.23V_a. \quad (6)$$

By comparing the results of the approximation (6) with the approximation (4), it may be seen that, in this numerical example, the value of the potential $V_p$ measured at the port 19 increases when the pressure level exerted on the sensitive surface increases. In fact, as may be seen in the calculations made above, when the pressure increases, the number of resistances involved between the resistive bands 12 and 16 increases. Furthermore, it is known that, by placing a first resistance in parallel with a second resistance, the equivalent resistance is lower than one or other of the resistances. Since the value of this equivalent resistance appears in this case in the denominator, it is normal that the value of the potential VP increases, therefore, when the value of the equivalent resistance decreases.

FIG. 4 shows how, with the same device, it is also possible to measure the position of the point of contact 30 with respect to the resistive band 16, that is to say to determine the value x. To do this, a potential difference is applied to the terminals of the resistive band 16 and the potential of this resistive band 16 is measured at the column 8 (or the resistive element 14) corresponding to the point of contact 30. The connection port 23 is then grounded (zero potential) and the port 25 is at a potential Va. The measurement of the potential at the resistive element 14 is made at the resistive band 12. The port 21 remains, for example, disconnected, this being equivalent to connecting it to a high impedance (HI). The voltage measurement is then carried out at the connection port 19 and a potential $V_H$ is measured. The apparatus for measuring this potential has a high impedance. No current can therefore flow in the resistive elements 10 and 14, nor in the resistive band 12. The measured potential $V_H$ is directly proportional to the position of the column 8 with respect to the resistive band 16. We therefore have the following equation:

$$x = V_H/V_a. \quad (7)$$

Likewise, the position of the point of contact 30 with respect to the resistive band 12 is measured.

In this case, a potential difference is applied to the terminals of the resistive band 12 and the potential at the rows 6 corresponding to the point of contact 30 is measured at the resistive band 16.

In that case, the connection port 19 is grounded (zero potential) and the connection port 21 is supplied with a potential $V_a$. One of the ports, 23 or 25, is disconnected (or connected to an infinite impedance HI) while the other port, for example 25, is connected to a voltage measurement device for measuring the potential $V_V$ at the rows 6 corresponding to the point of contact 30.

In this situation, it will be noted that the entire potential difference $V_a$ does not appear at the terminals of the resistive band 12. This is because the diode 28 is turned off and a voltage of around 0.6V appears at these terminals. To determine the value y, the equation therefore differs slightly from equation (7) and we have:

$$y = V_V/(V_a - 0.6V) \quad (8)$$

These measurements of the position of the point of contact may, for example, be made as soon as a contact between the two films has been detected and the pressure level associated with this contact has been measured.

It is also possible for a measurement cycle: pressure, position x, position y to be applied periodically. Depending on the periodicity of this measurement cycle, it becomes possible to track a movement of a finger over the sensitive surface.

The device as described above therefore makes it possible, with only four connection ports, to measure on the sensitive surface not only the position of a point of contact but also a pressure level associated with this point of contact.

In addition, the manufacturing cost of this sensitive surface is very considerably less than the cost of a capacitive-type sensitive surface.

The sensitive surface described has, in addition, the great advantage of being able to be transparent. The conducting tracks produced by metal deposition may be very narrow compared with their spacing. Only the resistive bands and the resistive elements are opaque. However, these elements may be shifted to the edges of the sensitive surface and their opacity therefore in general does not cause a problem.

FIG. 6 shows an alternative embodiment differing slightly from the devices shown in FIGS. 2 to 5. In this embodiment, the diode 28 is omitted. However, a further port 32 is added. This fifth port 32 is connected to the system between the resistive component 26 and the resistive band 12. This port 32 is used to measure the position of the point of contact, whereas the port 21 is used, as described above, to determine the pressure level of the contact made on the sensitive surface.

The present invention is not limited to the embodiments described above as nonlimiting examples, but also relates to any alternative embodiment within the competence of a person skilled in the art with regard to the claims appended hereto.

Thus, for example, the geometry of the sensitive surface described may be modified. The conducting tracks are not necessarily straight and tracks that are not parallel but placed in a fan arrangement (or differently) may, for example, be envisioned.

The materials indicated are indicated as examples and may be replaced by other equivalent materials. The above description is given with reference to a translucent sensitive surface since the present invention is particularly suited to sensitive surfaces of this kind. However, opaque surfaces may use the same structure.

Different methods may be used to measure the pressure level at the point of contact. In the invention, it is essential to measure a significant resistance of the pressure level or, which is equivalent, a potential whose value depends on this resistance.

The invention claimed is:

1. A touch-sensitive surface comprising two films (2, 4) facing each other and means for keeping these two films a certain distance apart when no pressure is exerted on the surface, characterized in that each film (2, 4) has, on its face turned toward the other film:
- an array of conducting tracks (6, 8) that do not touch one another, each having a low resistance;
- a resistive band (12, 16);
- resistive elements (10, 14), each resistive element (10, 14) connecting a conducting track (6, 8) to the resistive band (12, 16); and
- wherein each end of the resistive band (12, 16) is connected to a connection port (19, 21, 23, 25) and in that one end is connected to its connection port (21) via a resistive component (26) of known resistance (R/5) mounted in parallel with a diode (28).

2. The sensitive surface as claimed in claim 1, characterized in that the resistive band (12, 16) of each film (2, 4) is produced along one edge of this film.

3. The sensitive surface as claimed in claim 1, characterized in that the conductive tracks (6, 8) form an array of substantially parallel lines on each film.

4. The sensitive surface as claimed in claim 1, characterized in that the resistance (r) of a resistive band (12, 16) is substantially lower than the resistance (R) of each resistive element (10, 14) connecting a conducting track (6, 8) to this resistive band (12, 16).

5. The sensitive surface as claimed in claim 1, characterized in that the resistive bands (12, 16) and the resistive elements (10, 14) are made of carbon, which is screen-printed onto the corresponding film (2, 4).

6. A touch-sensitive surface comprising two films (2, 4) facing each other and means for keeping these two films a certain distance apart when no pressure is exerted on the surface, characterized in that each film (2, 4) has, on its face turned toward the other film:
- an array of conducting tracks (6, 8) that do not touch one another, each having a low resistance;
- a resistive band (12, 16);
- resistive elements (10, 14), each resistive element (10, 14) connecting a conducting track (6, 8) to the resistive band (12, 16); and
- wherein each end of the resistive band (12, 16) is connected to a connection port (19, 21, 23, 25), in that one end is connected to its connection port (21) via a resistive component (26) of known resistance (R/5) and in that an additional connection port (32) connected to the sensitive surface between the resistive component (26) and the corresponding resistive band (12) is provided.

7. The sensitive surface as claimed in claim 6, characterized in that the resistive band (12, 16) of each film (2, 4) is produced along one edge of this film.

8. The sensitive surface as claimed in claim 6, characterized in that the conductive tracks (6, 8) form an array of substantially parallel lines on each film.

9. The sensitive surface as claimed in claim 6, characterized in that the resistance (r) of a resistive band (12, 16) is substantially lower than the resistance (R) of each resistive element (10, 14) connecting a conducting track (6, 8) to this resistive band (12, 16).

10. The sensitive surface as claimed in claim 6, characterized in that the resistive bands (12, 16) and the resistive elements (10, 14) are made of carbon, which is screen-printed onto the corresponding film (2, 4).

* * * * *